(12) United States Patent
Kamohara

(10) Patent No.: US 7,583,053 B2
(45) Date of Patent: Sep. 1, 2009

(54) BATTERY PACK CONTROLLER WITH SPECIFIC BATTERY VOLTAGE DETECTION

(75) Inventor: Hideaki Kamohara, Ayase (JP)

(73) Assignee: Nissan Motor Co., Ltd., Yokohama, Kanagawa (JP)

( * ) Notice: Subject to any disclaimer, the term of this patent is extended or adjusted under 35 U.S.C. 154(b) by 84 days.

(21) Appl. No.: 11/484,307

(22) Filed: Jul. 11, 2006

(65) Prior Publication Data

US 2007/0013347 A1    Jan. 18, 2007

(30) Foreign Application Priority Data

Jul. 12, 2005    (JP)    ............................. 2005-202791

(51) Int. Cl.
*H02J 7/00*    (2006.01)
(52) U.S. Cl. .................. 320/106; 320/162; 324/433
(58) Field of Classification Search .................. 320/104, 320/150, 116, 120, 134, 136, 162; 324/433
See application file for complete search history.

(56) References Cited

U.S. PATENT DOCUMENTS

| | | | | |
|---|---|---|---|---|
| 6,484,637 B2 * | 11/2002 | Lewis | .......................... | 101/456 |
| 6,486,637 B1 * | 11/2002 | Nakanishi et al. | ............ | 320/150 |
| 6,653,745 B1 * | 11/2003 | Masaki et al. | ............... | 307/10.1 |
| 7,106,047 B2 * | 9/2006 | Taniguchi | .................... | 324/126 |
| 2004/0051500 A1 * | 3/2004 | Kuroda et al. | ................ | 320/104 |
| 2005/0088139 A1 * | 4/2005 | Frank | .......................... | 320/104 |
| 2005/0110460 A1 * | 5/2005 | Arai et al. | ..................... | 320/116 |
| 2005/0252474 A1 * | 11/2005 | Sah et al. | .................. | 123/179.3 |
| 2005/0257545 A1 * | 11/2005 | Ziehr et al. | .................... | 62/236 |

FOREIGN PATENT DOCUMENTS

JP    2004-166367    6/2004

\* cited by examiner

*Primary Examiner*—Akm E Ullah
*Assistant Examiner*—Arun Williams
(74) *Attorney, Agent, or Firm*—Young Basile

(57) ABSTRACT

The invention provides a specific battery detection means that specifies single batteries believed to be in an excess discharge state during operation of the electric motor for starting the engine, based on data for each battery pack detected prior to starting the engine. With the specific battery detection means, a change in voltage for specific single batteries is measured for a drop in voltage of a single battery by the discharge via the voltage detection means. The specific battery detection means is configured such that if the results of this measurement are outside a predetermined threshold value, the power supplied to the electric motor for starting the engine is limited.

21 Claims, 9 Drawing Sheets

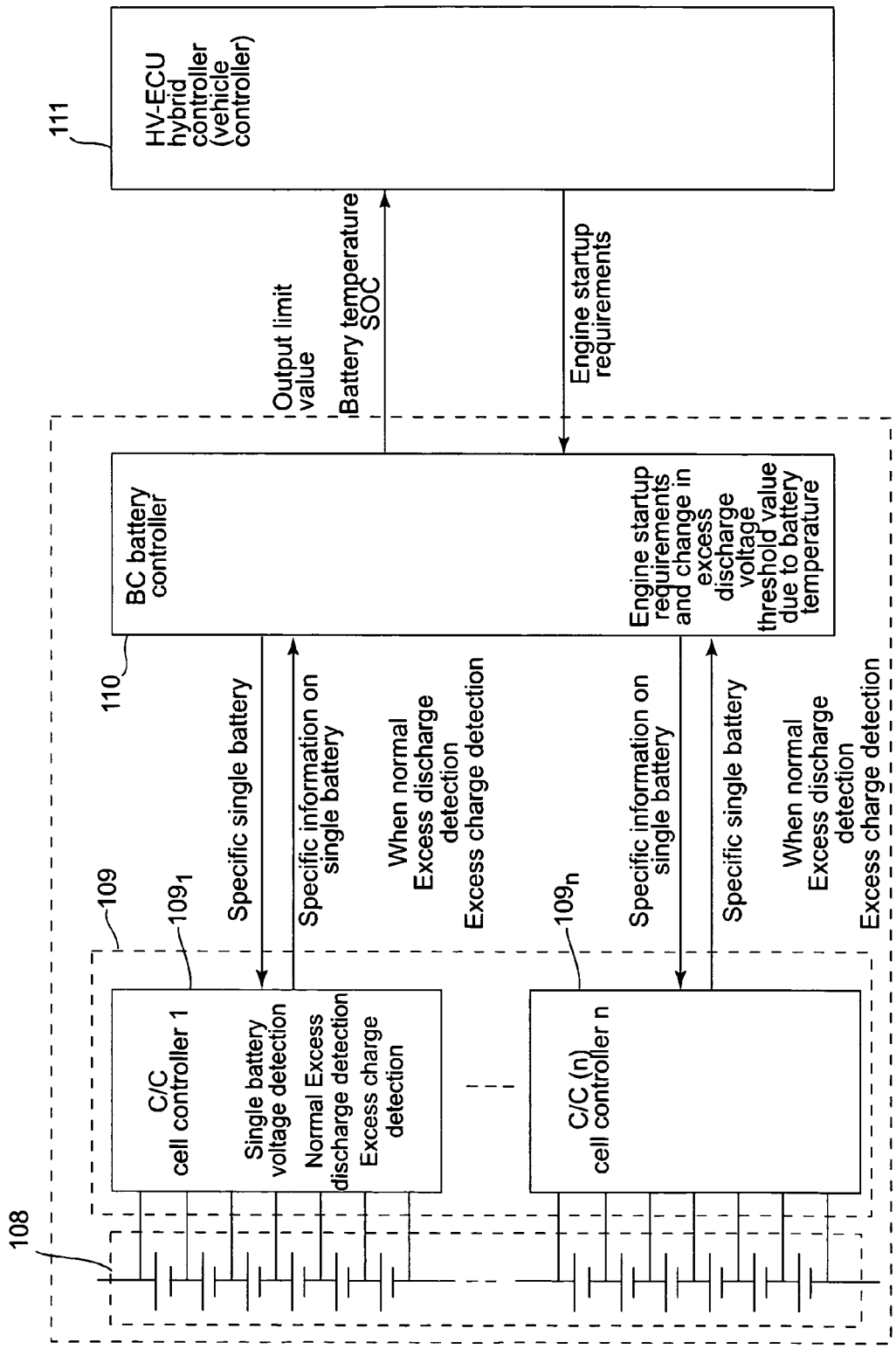

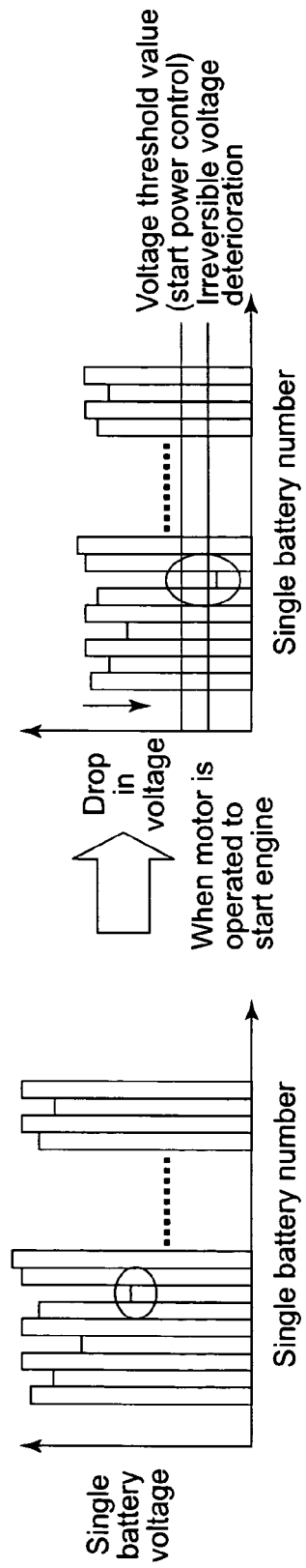
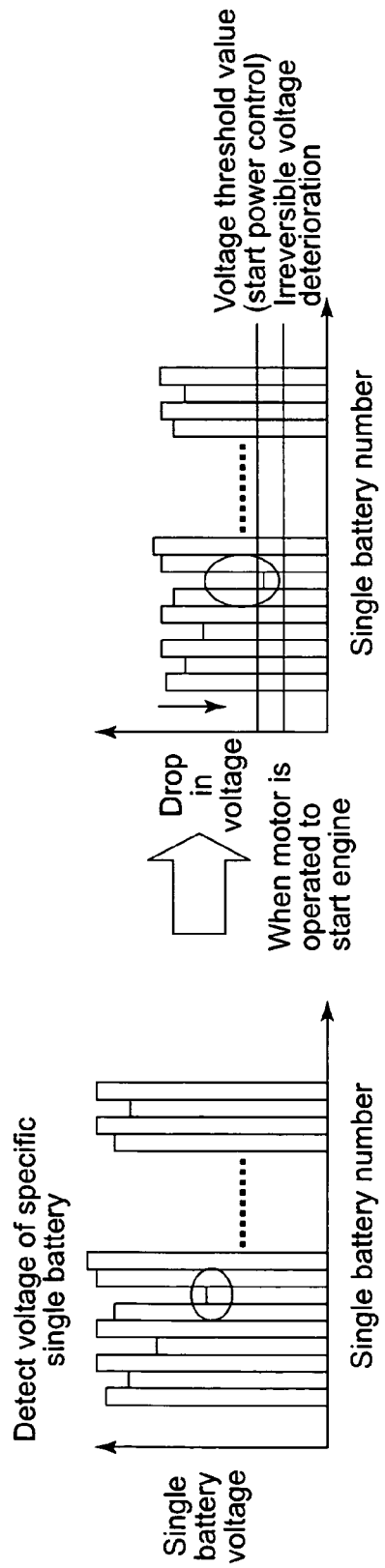
FIG. 3A
FIG. 3B

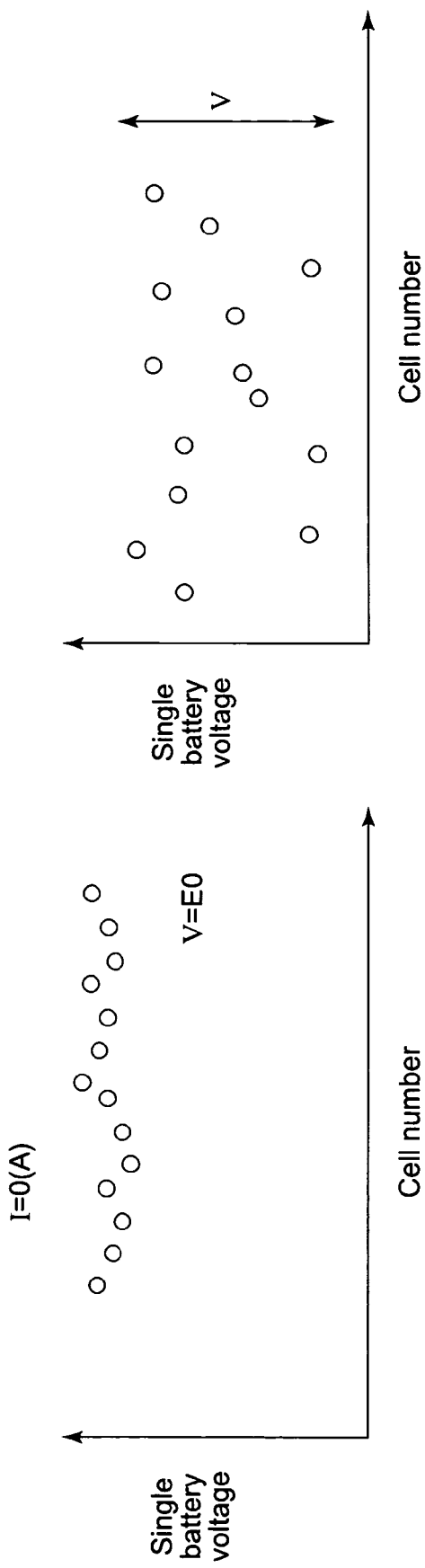

BATTERY PACK CONTROLLER WITH SPECIFIC BATTERY VOLTAGE DETECTION

This application claims priority to Japanese Patent Application No. 2005-202791, filed Jul. 12, 2005, the entire content of which is incorporated herein by reference.

TECHNICAL FIELD

The invention relates to a battery pack controller for a hybrid vehicle.

BACKGROUND

Hybrid vehicles use an electric motor for generation connected to an engine as the electric motor for engine startup. In this case, the electrical power source for driving this electric motor for generation involves a battery pack structured to connect a plurality of single batteries used when driving the electric motor of the vehicle. For example, some systems include a battery pack controller equipped with a detection circuit that detects whenever the voltage of any single battery drops below a given voltage, and when the detection circuit detects that the voltage of any single battery of the battery pack has dropped below the given voltage, controls the power supplied from the battery pack to the electric motor for starting the engine.

SUMMARY

At the time of engine startup, an electric motor requires a large amount of a temporary power supply. This may result in the possibility of an excess discharge state at a single point, due to the large amount of power discharged from a single battery. The present invention provides a battery pack controller capable of accurately detecting excess discharge. The techniques may be applied without increasing the scope of the circuit.

The invention provides a specific battery detection means that specifies single batteries believed to be in an excess discharge state during operation of the electric motor, based on data on each battery pack detected. With the specific battery detection means, a change in voltage for specific single batteries is measured continuously or at short intervals for a drop in voltage of a single battery by the discharge via the voltage detection means.

With the present invention, voltage measurements are conducted on a specific single battery believed to be in an excess discharge state when the electric motor for starting the engine is operated, making it possible to rapidly detect an excess discharge state for a single battery. This may have the effect of preventing an irreversible deterioration of single batteries due to excess discharge.

In one embodiment, a battery pack controller connected with a battery pack, the battery pack including a plurality of batteries to supply electric power to a motor/generator, includes a voltage detector to detect a voltage of each of the batteries. The battery pack controller further includes a detected voltage transmitter to retrieve voltage detected on the plurality of single batteries from a plurality of voltage detectors and continuously transmit each voltage detected, and a specific battery detector that, based on the transmitted voltage detected, specifies as target single batteries for voltage detection those single batteries believed to have minimal voltage when the electric motor is operated. The battery pack controller also includes a power supply controller that controls power supplied from the battery pack to the electric motor when the single battery voltage detected by the voltage detector is below a preset threshold voltage value. The voltage detector detects a voltage for the target single battery prior to operating the electric motor for starting the internal combustion engine.

In another embodiment, a vehicle equipped with an internal combustion engine includes an electric motor for internal combustion engine startup capable of starting the internal combustion engine. The vehicle also includes a battery pack including a plurality of single batteries that supply power to the electric motor, and a voltage detector capable of detecting the voltage of each of the single batteries. The vehicle further includes a detected voltage transmitter capable of retrieving voltage detected on the plurality of single batteries from a plurality of voltage detectors and continuously transmitting each voltage detected, and a specific battery detector that, based on the transmitted voltage detected, specifies as target single batteries for voltage detection those single batteries believed to have minimal voltage when the electric motor is operated. The vehicle also includes a power supply controller that controls power supplied from the battery pack to the electric motor when the single battery voltage detected by the voltage detector is below a preset threshold voltage value. The voltage detector detects a voltage for the target single battery prior to operating the electric motor for starting the internal combustion engine.

In another embodiment, a battery pack controller connecting a plurality of single batteries that comprise a battery pack and that supply power to an electric motor for starting an internal combustion engine comprises means for detecting a voltage of each of the plurality of single batteries and supplying power to the electric motor, means for retrieving the voltage detected of the plurality of single batteries and continuously transmitting each voltage detected, and means for specifying as target single batteries for voltage detection those single batteries believed to have minimum voltage when the electric motor is operated, based on the transmitted voltage detected. The battery pack controller also includes means for detecting a voltage for the target single battery prior to operating the electric motor for starting the internal combustion engine and controlling power supplied from the battery pack to the electric motor for starting the internal combustion engine when the detected target single battery voltage is less than a prescribed threshold voltage value.

In yet another embodiment, a method comprises detecting a voltage of each of a plurality of single batteries that comprise a battery pack and that supply power to an electric motor for starting an internal combustion engine, retrieving the voltage detected on the plurality of single batteries, and continuously transmitting each voltage detected. The method further comprises, based on the transmitted voltage detected, specifying as target single batteries for voltage detection those single batteries believed to have minimum voltage when the electric motor is operated. The method also includes detecting a voltage for the target single battery prior to operating the electric motor for starting the internal combustion engine, and controlling power supplied from the battery pack to the electric motor for starting the internal combustion engine when the detected target single battery voltage is less than a prescribed threshold voltage value.

BRIEF DESCRIPTION OF DRAWINGS

FIG. 2 is a structural diagram illustrating an example structure of the battery pack control system.

FIGS. 3A and 3B are theoretical descriptive figures of the method to control charging and discharging of the batteries, and show an example comparison between the voltage detection method of the present invention (in FIG. 3B) and an example voltage detection method of an existing, conventional system (in FIG. 3A).

FIGS. 6A and 6B are graphs illustrating exemplary distribution of single battery voltage showing the impact of the load on the single battery voltage.

DETAILED DESCRIPTION

Figure 1:
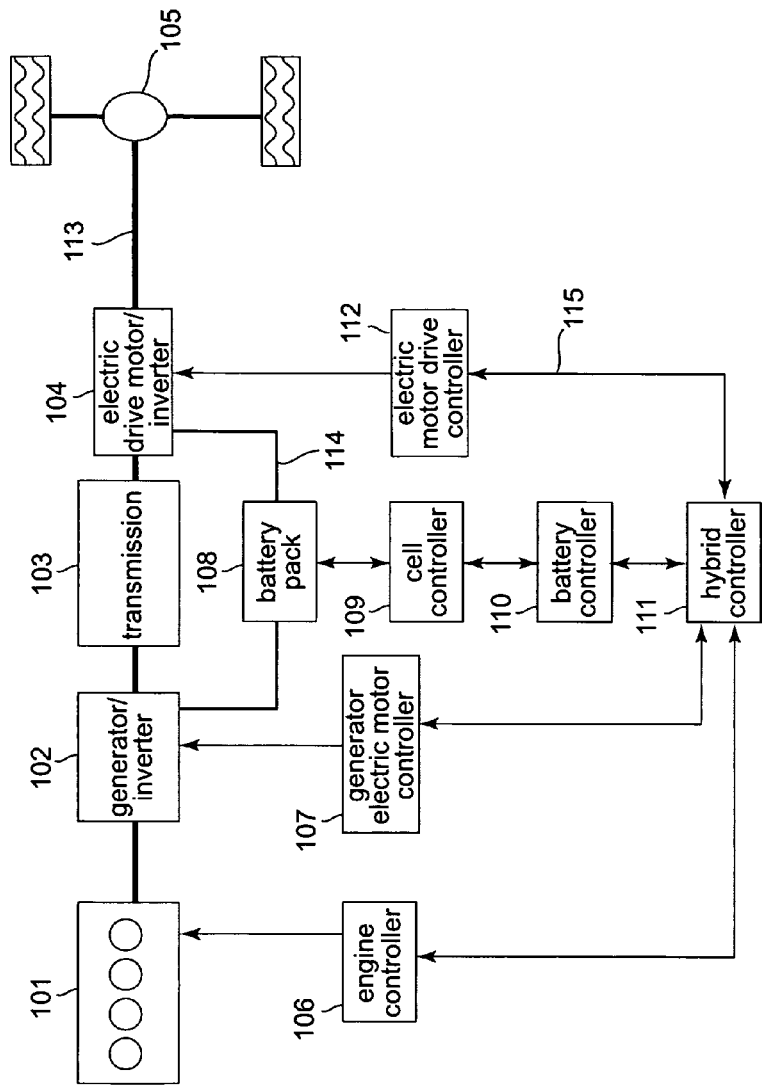
FIG. 1 is a block diagram illustrating example configuration of an electrical system for a hybrid vehicle containing an internal combustion engine and an electric motor in accordance with the principles of the present invention.

FIG. 1 is a block diagram illustrating example configuration of an electrical system for a hybrid vehicle containing an internal combustion engine and an electric motor. In FIG. 1, the power axle for the engine 101 in the internal combustion engine, the generator/inverter 102 (motor/generator), the transmission 103, the electric drive motor/inverter 104 (motor/generator) and the final gear 105 that transmits power to the wheels are all mechanically connected to the drive force transmission axle 113 (thick solid line). The generator/inverter 102 driven by the engine 101 generates electric power and charges the battery pack 108 via the power transmission line 114 (medium solid line). When the engine 101 is started, the battery pack 108 supplies electric power to the generator/inverter 102, which is operated as for starting the engine.

The state of battery charge (hereafter, abbreviated as SOC: State of Charge) for the battery 108 is detected by checking the voltage, excess discharge and excess charge of each battery using the cell controller 109. The detected SOC data is input to the battery controller 110 and after data processing by the battery controller 110, the processed SOC data is sent back to the cell controller 109 again as information to control the charge and discharge of the battery pack. The operation of this cell controller 109 and the battery controller 110 are described later in FIG. 2. The engine 101 is controlled by the engine controller 106, the generator/inverter 102 is controlled by the generator electric motor controller 107 and the electric drive motor/inverter 104 is controlled by the electric drive controller 112. Each of these controllers is controlled by hybrid controller 111. Each of these control systems are connected with the control line 115. The cell controller 109 and battery controller 110 may be unitized.

FIG. 2 is a structural diagram illustrating an example structure of the battery pack control system. The battery controller for the battery pack of Embodiment 1 is configured as shown in FIG. 2, and a description of the configuration and operation follows. In each battery of the battery pack 108, there is a cell controller (hereafter abbreviated as C/C) $109_1$-$109_n$ connected to a voltage detection circuit that detects the voltage of each single battery, an excess discharge detection circuit that detects the excess discharge state, an excess charge detection circuit that detects the excess charge state of a single battery, and a current bypass circuit to balance the charges of single batteries of the battery pack.

In FIG. 2, the battery pack 108 comprised of a plurality of single batteries is split into a smaller number of single battery groups (blocks) (in FIG. 2, there are n blocks of 6 single batteries), forming a structure of connected groups of single batteries C/C1 ($109_1$)-C/Cn ($109_n$). In C/C1 ($109_1$)-C/Cn ($109_n$), voltage detection is conducted on each single battery group and regularly detects whether or not there is an excess discharge or charge state for each battery group.

In the battery controller (hereafter abbreviated as B/C) 110, the voltage value for each single battery detected with the cell controller $109_1$-$109_n$ is specified for a single battery by estimating the excess discharge state when the engine starts up using the specific battery detection process described later. For each battery specified, measurements of the change in voltage are conducted continuously or at short intervals, for reductions in voltage of single batteries via single battery discharge during engine startups.

FIGS. 3A and 3B are theoretical descriptive figures of the method to control charging and discharging of the batteries, and show an example comparison between the voltage detection method of the present invention (in FIG. 3B) and an example voltage detection method of an existing, conventional system (in FIG. 3A). FIG. 3A shows the detection method for the change in voltage for a single battery using the existing method. The system is configured such that voltage detection proceeds in order for each of the batteries making up the battery pack (for example, in order of the number on each single battery). As a result, there may be a discharge of a large amount of current in a short period of time as when operating an electric motor for starting the engine, especially during the winter with low temperature conditions. In this case, since the drop in voltage of a single battery is rapid, even if the voltage threshold value (the value where limits are imposed on the discharge power supplied) is not reached as shown in FIG. 3A (within the circled area to the left of the FIG. in FIG. 3A), if voltage detection for each single battery is sequentially performed and it returns to that particular single battery, there may be cases where the single battery voltage drops to below irreversible voltage deterioration (the voltage of the battery is subject to irreversible deterioration due to excess discharge) due to a state of excess discharge. This is shown in the right of FIG. 3A.

FIG. 3B describes the voltage detection method with the present invention. The single battery where the state shown within the circled area to the left of FIG. 3B is detected and specified by the specific battery detection process. Voltage detection is performed for that single battery and if the single battery voltage detected falls below the voltage threshold value, a discharge limit corresponding to the voltage below the voltage threshold value is assigned to C/C1 ($109_1$)-C/Cn ($109_n$) by the B/C 110.

Since in the method of the present invention it is possible to control the amount discharged at the point when voltage reduction drops below the threshold value, in addition to curtailing the time to detect discharge, it is possible to prevent irreversible voltage deterioration due to excessive discharge from the battery.

The specific battery detection process corresponds to the steps performed by B/C 110 in which, if the excess discharge is at the minimum voltage when the engine started by the electric motor operates, the single battery is designated for treatment as a target voltage detection battery based on the single battery voltage detected by the single battery voltage detection circuit, the single battery internal resistance detected when operating prior to this processing, and the temperature distribution in the battery pack obtained from the plurality of temperature detection sensors placed in the battery pack but not shown in figures.

In the present invention, the voltage for each single battery making up the battery pack 108 is detected by the voltage detection circuit prior to operating the electric motor for engine startup. Of the plurality of single batteries making up the battery pack, if the electric motor for engine startup is operated, the single battery believed to have the minimum voltage is specified by the specific battery detection process. With this specific battery detection process, the voltage of the single battery specified is preferentially detected by the voltage detection circuit connected to such single batteries at engine startup. When the electric motor for engine startup operates, the voltage detection circuit detects the voltage of the prescribed single batteries specified by the specific battery detection process as single batteries targeted for detection. If the single battery voltage detected by the voltage detection circuit is lower than the prescribed threshold value, a command is given by the B/C 110 (power supply controller) to limit the power supplied from that battery pack to the electric motor for engine startup.

Figure 4:
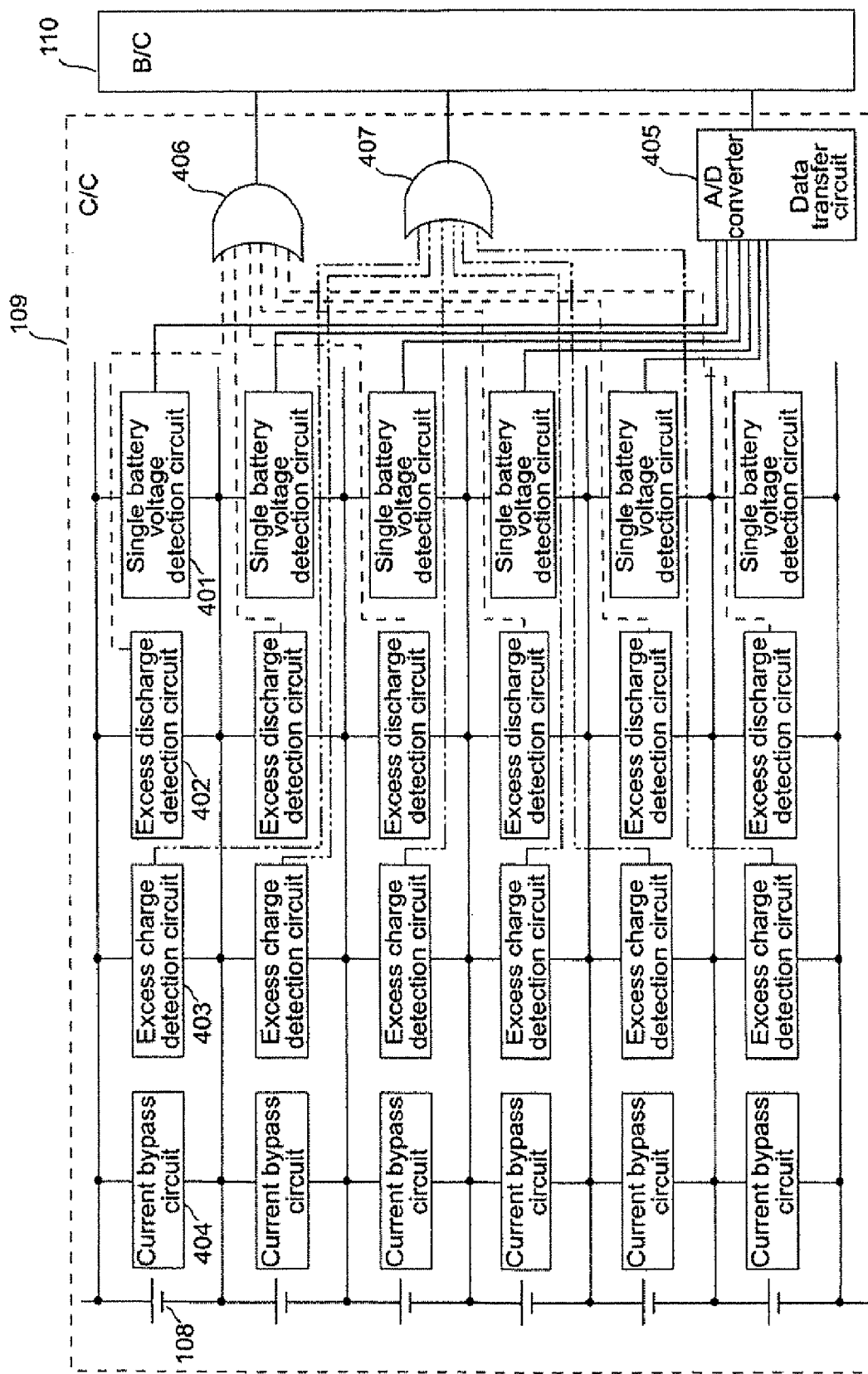
FIG. 4 is a block diagram representing an exemplary internal structural diagram of an example cell controller.

FIG. 4 is a block diagram representing an exemplary internal structural diagram of an example cell controller. As indicated above, the charge state for battery pack 101 charging and discharging is measured by C/C1 (109$_1$)-C/Cn (109$_n$). The internal configuration for one of these C/C is shown in FIG. 4. There are the same number n of the C/C connected to the battery pack 108. Voltage measurement is conducted by the voltage detection circuit 401 for each single battery making up the battery pack 108 and abnormal detection is conducted for each item using the excess discharge detection circuit 402 and the excess charge detection circuit 403. The detection results for the voltage detection circuit 401 may be analog values, in which case the detection results are digitized by the A/D converter 405. These detected voltage values are transmitted to the B/C 110 via the data transmission circuit (detected voltage transmitter) housed in this A/D converter 405. The A/D converter 405 converts the voltage for each single battery detected with each voltage detection circuit 401 into digital signals, and they are transmitted to the B/C 100 sequentially, such as every 0.05 seconds. The voltage of each single battery in FIG. 4 can be sent to B/C 100 with a single A/C converter 405 and thus can prevent an increase in costs.

Based on the single battery voltage detected by the single battery voltage detection circuit transmitted from the A/D converter 405, the single battery internal resistance detected when operating prior to this processing, and the temperature distribution in the battery pack obtained from the plurality of temperature detection sensors placed in the battery pack but not shown in the FIG., if the excess discharge is at the minimum voltage when the engine started by the electric motor operates, the single battery is designated for treatment as a target voltage detection battery by the B/C100. When the electric motor is operated to start the engine, the A/D converter 405 is directed to preferentially transmit voltage information about the specified single battery.

The output from the excess discharge detection circuit 402 and the excess charge detection circuit 403 is transmitted to the B/C 110 via the OR circuit 406 and 407. The OR circuit 406 and 407 can have the same specifications. If a single battery with an excess charge state is detected, discharge is conducted via the current bypass circuit 404 until the SOC of this battery is approximately the same level as other single batteries.

Figure 5:
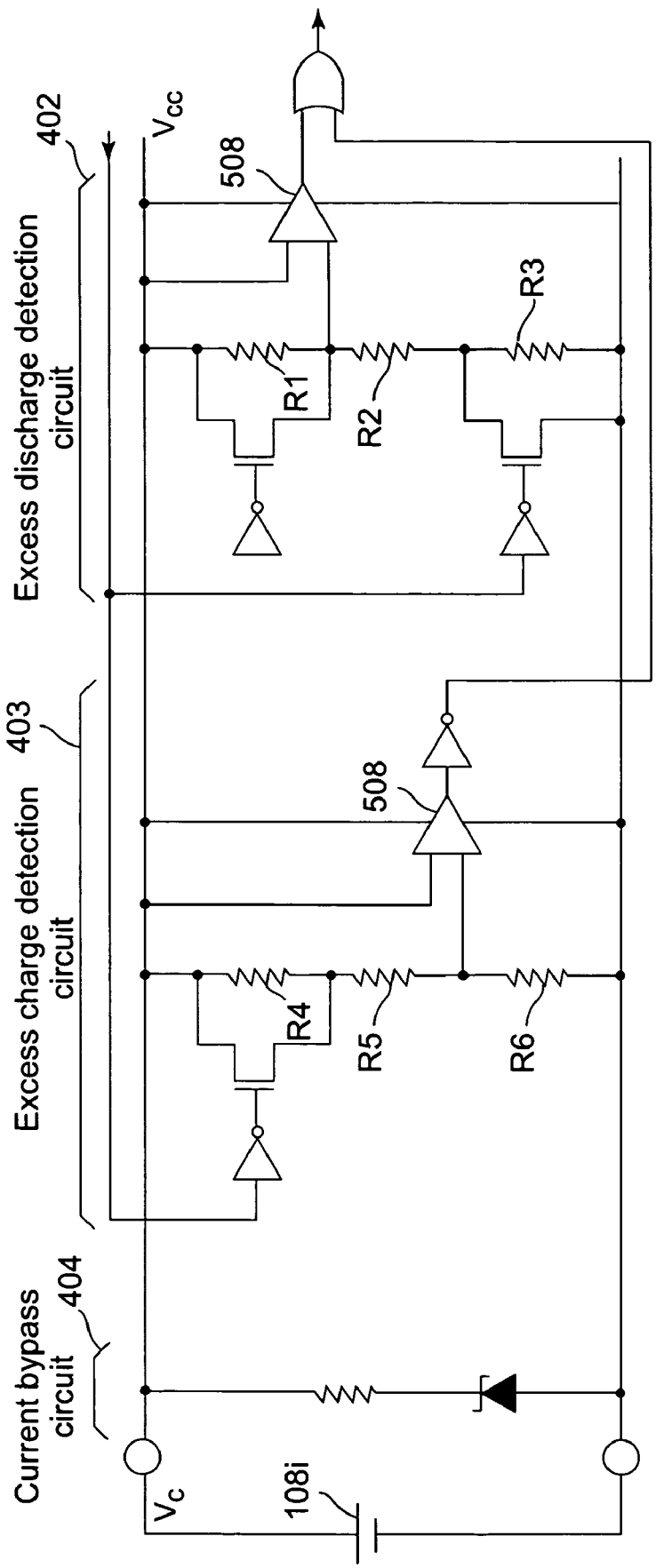
FIG. 5 is a circuit diagram of an example cell controller for a single battery.

FIG. 5 is a circuit diagram of an example cell controller for a single battery. For example, the excess discharge detection circuit 402, the excess charge detection circuit 403 and the single battery voltage detection circuit 401 have the circuit configuration shown in FIG. 5. An excess discharge or an excess charge state is detected using the voltage comparator 508 on voltage Vc for the single battery 108i in the battery pack and voltage from the current voltage Vcc divided by resistance R1~R3 and resistance R4~R6. It is designed to adjust the single battery SOC that forms the battery pack 108. The single battery voltage detection circuit 401 is an analog voltage detector and as stated previously, the voltage values corresponding to the measurement results are ultimately transmitted to the battery controller (B/C) 110 as digital data so the input side of the A/D converter 405 is used as the single battery voltage detection circuit 401.

In the present invention, if the system main relay (hereafter abbreviated as SMR) that is the main switch connected to the battery pack 108 terminal is in the OFF state, the battery pack is in a no-load state. Single battery voltage detection may be performed even when the SMR is ON, if the power consumption is minimal due to auxiliary operation. The single battery terminal voltage is expressed with the following formula.

$$V = E_0 + IR$$

Here, V is the terminal voltage, $E_0$ is the open circuit (open) voltage, I is the load current and R is the single battery internal resistance. Measuring the open voltage for all of the single batteries before turning the SMR ON enables detection of the SOC for each single battery.

FIGS. 6A and 6B are graphs illustrating exemplary distribution of single battery voltage showing the impact of the load on the single battery voltage. As shown in FIG. 6A, if there is no-load or a light load, I~0 so V~$E_0$ and the variation of single battery voltages is low. As shown in FIG. 6B, if there is a large load such as that of the electric motor drive for startup, the second item in the formula above can be ignored and the difference in performance between each single battery can be seen, the variation in single battery voltages is high and there is a possibility of an excess discharge state during engine startup, which causes problems for single batteries.

The specific battery detection process can be expressed like that it conducts processing to detect the battery with the lowest power level for potential power discharge (in other words, the battery reserve) up to a threshold value. The threshold value is the excess discharge limit startup voltage that activates the battery discharge limits, if the threshold value is exceeded on the single batteries that make up the battery pack 108. Here, this calculates the potential power discharge using the open voltage for single batteries previously designated (no-load or light load voltage), the internal resistance value (such as the stored internal resistance value from detection at completion of previous operation) calculated from the load current during operation prior to the relevant point and the previous threshold value voltage. With this type of processing, the single battery voltage is input to B/C 110 via the C/C1 (109$_1$)-C/Cn (109$_n$), the calculation processing is conducted by the B/C 110 and the indication of the open limit is output.

As indicated above, the present invention is configured such that if there is an excess discharge state during engine startup, the theoretical single battery is detected in advance and voltage measurements can be conducted on this single battery. Thus, there is no need to measure single batteries that are normal, and it becomes possible to quickly designate and check single batteries believed to be in an excess discharge state.

With B/C 110, a temperature distribution for the battery pack 101 is obtained via the plurality of temperature detectors (sensors) inserted inside the battery pack 108 (not shown). The mutual relationship between the single battery temperature and internal resistance is measured in advance in the B/C 110 and stored as a map. The internal resistance value for the battery specified previously that corresponds to the temperature detected with the temperature detector using the map of the mutual relationship between the temperature/internal resistance can be calculated and corrected with the B/C 110 (internal resistance corrector).

Figure 7A:
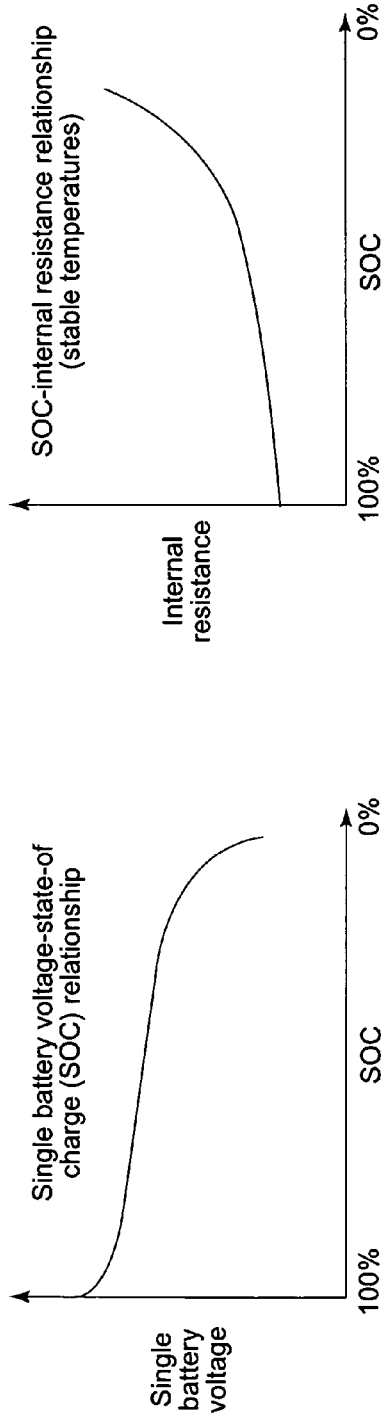
FIGS. 7A-7C are graphs showing the relationship between open circuit voltage, SOC, internal resistance and temperature for example lithium batteries.
Figure 7B:
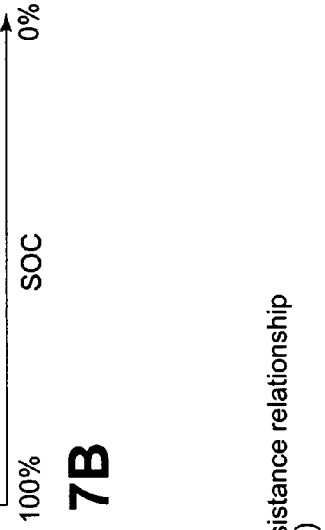
Figure 7C:
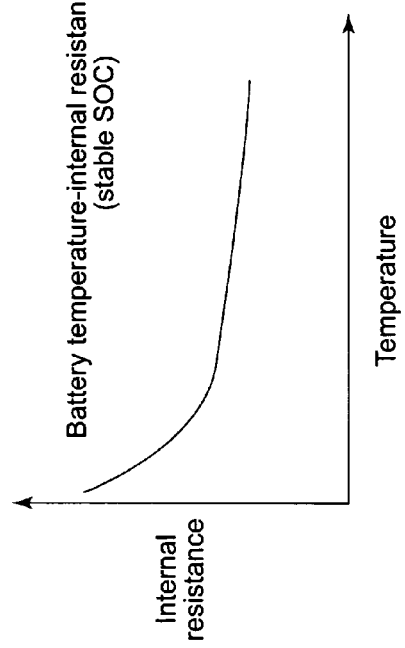

FIGS. 7A-7C are graphs showing the relationship between open circuit voltage, SOC, internal resistance and temperature for example lithium batteries. FIG. 7A shows the relationship between the SOC for single batteries and the single battery voltage so with a sufficiently charged state, the single battery voltage is high and the drop in battery voltage appears as discharge continues. FIG. 7B shows the relationship between the SOC and single battery internal resistance so with a sufficiently charged state, the internal resistance is low and the increase in internal resistance appears as discharge continues. FIG. 7C shows the relationship between the single battery temperature and the internal resistance so as the temperature drops, the internal resistance increases. The data is measured and saved in the B/C 110 as a map. Based on this data, correction of the single battery internal resistance can be performed during engine startup. The current value supplied to the electric motor for engine startup is controlled and engine startup may be easy.

If the preset temperature for the battery pack 108 or the battery output limit value (the discharge power is limited by the temperature properties of the battery pack 108, the temperature where engine startup is difficult or the power limit value) calculated from the SOC and the single battery temperature is lower than the value set in advance for the equipment. When the battery pack begins discharging for engine startup, the B/C 110 specifies the single battery believed to have the highest probability of the lowest single battery voltage, based on the voltage for all of the single batteries, the temperature distribution for the battery pack and the internal resistance detected during the previous operation. The method for specifying can be that shown in FIG. 3B.

With C/C1 (109₁)-C/Cn (109ₙ), since voltage detection limiting the designated single battery continues, subsequent measurements are at low temperatures so voltage detection can be at frequent intervals or continuously even during conditions when there are rapid changes in the single battery voltage. Thus, C/C1 (109₁)-C/Cn (109ₙ) and B/C 110 enter the power loading state when the ignition is on (IGN_ON). As indicated before, the C/C1 (109₁)-C/Cn (109ₙ) and B/C 110 retrieve the open voltage for all of the single batteries prior to the SMR (system main relay) is loaded.

With the SMR power ON, the engine startup requirements are input to the B/C 110 from the vehicle controller 111 and the B/C 110 temporarily establishes the excess discharge voltage threshold value 1 (discharge limit open voltage/discharge limit ratio 0%) and the excess discharge voltage threshold value 2 (discharge limit prohibited voltage/discharge limit ratio 100%) at a prescribed setting lower than normal temperature. Additionally, the vehicle controller 111 issues commands to the generator/inverter controller 107 for engine startup.

Thus, the discharge limit ratio of 0% indicates a state where the discharge from the batteries is not limited and a discharge limit ratio of 100% indicates a discharge prohibited state where discharge from the batteries is completely restricted. Also, during engine startup, the excess discharge voltage threshold value 1 is the open voltage level believed to be the excess discharge level for the battery. The excess discharge voltage threshold value 2 is the level where current does not flow to the battery terminal due to prohibited discharge, and is a level that causes electrode corrosion.

In conjunction with this, power is supplied to the electric motor for engine startup (generator 102) from the battery pack 108. During this discharge, voltage detection for single batteries in the battery pack 108 designated in advance is performed at short intervals or continuously compared with the changes in voltage for single batteries. The voltage detected is compared to the excess discharge voltage threshold value 1 and 2 modified as indicated above. If the voltage detected drops below the voltage threshold value 1, the power limit value is further narrowed down and controlled to where it will not reach the discharge prohibited voltage that is the voltage threshold value 2.

After engine startup, the vehicle controller 111 conducts power charging or discharging as previously established for single batteries within the SOC range set, until the battery temperature reaches the designated value, without allowing the engine to stop (excluding when the IGN_OFF). After engine startup, once the battery temperature reaches the designated value, B/C 110 and C/C1 (109₁)-C/Cn (109ₙ) return the excess discharge detection threshold value 1 and 2 to the normally set value and exits the mode conducting voltage detection on only those batteries designated. It then returns to the mode for normal excess discharge voltage threshold value detection.

As indicated above, with the third embodiment for the present invention, the voltage threshold value for which the output power controller (output power control means) controls the charge state for specific single batteries believed to be in an excess discharge state during engine startup is set with the battery temperatures when the engine is running or during startup, or a combination of these. If the battery temperature is lower than the designated temperature, it is lowered to the preset voltage threshold value prescribed for this battery temperature. When the engine or battery recovers to a normal state, this voltage threshold value is returned to the original state.

Also, if the battery temperature is higher than the designated temperature, the internal resistance is calculated for the charge state for the lower control limit for the SOC control range (normal is 30~80%) set for single batteries from the internal resistance previously calculated and the battery temperature. The maximum load (the level where the maximum battery output and output limits are started) is estimated to calculate the control open voltage threshold value. With engine startup at a low temperature that does not reach the prescribed temperature for the battery, the control open voltage threshold limit is determined by estimating the load required for engine startup without the maximum load.

As indicated above, single batteries in the sequentially connected battery pack that have a high probability of reaching the voltage threshold value are specified for output power limits by the single battery specification process. Single battery voltage detection is conducted only on those single batteries specified during operation of the electric motor for engine startup. Thus, even if there is a rapid drop in battery voltage, it is possible to accurately detect when it is below the designated voltage threshold value without dead time during measurements. As a result, it is possible to prevent an excess discharge state (lower than the irreversible voltage deterioration) in advance.

After turning the ignition switch ON, and after the initial engine startup before the engine temperature rises, the engine is not allowed to stop until the battery temperature exceeds the preset temperature, with the exception of when the ignition switch is turned OFF. As a result, since the engine and battery temperature is not sufficiently high, after the engine stops, it cannot be restarted, making it possible to avoid stopping the vehicle while running. This process is executed by the B/C 110 and vehicle controller 111.

With a normal state involving an excess discharge or excess charge threshold value detection state for all of the single batteries that make up the battery pack, if a single battery is detected exceeding the first threshold value for the discharge power control open voltage in either the excess discharge or excess charge state, voltage detection for the single batteries is conducted with the cell controller block containing this single battery. A designation is made for a single battery exceeding the first threshold value. Voltage detection is conducted either continuously or at frequent intervals on the specified single battery. The battery pack controller is configured to control the B/C 110 using software in the battery controller to the previous single battery charge state so the second threshold value is not reached where the single battery would be subject to irreversible voltage deterioration.

Figure 8:
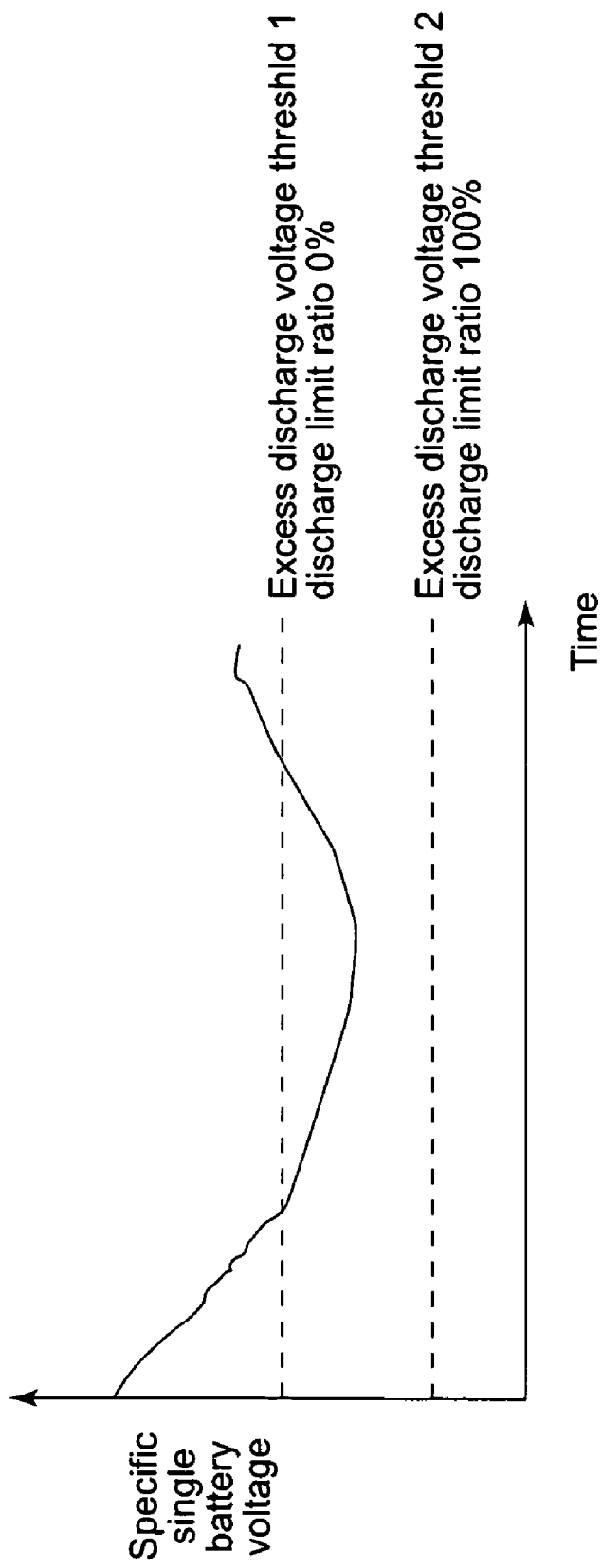
FIG. 8 is a graph illustrating an exemplary method of limiting power between threshold 1 and 2 for the excess discharge voltage.

FIG. 8 is a graph illustrating an exemplary method of limiting power between threshold 1 and 2 for the excess discharge voltage. FIG. 8 describes this control method, where the discharge limit ratio in the region above the excess discharge voltage threshold value 1 is 0% and in this region, there is no limit to the discharge from a single battery. The discharge limit ratio in the region below the excess discharge voltage threshold value 2 is 100% so discharge from a single battery in this region is prohibited. The region between these threshold values is where the discharge limit ratio is set according to the position.

In FIG. 8, the single battery voltage decreases over time as it progresses from left to right and if the excess discharge voltage threshold value 1 is exceeded, it enters the middle region. In the B/C 110, the discharge limit ratio changes and the discharge limit ratio is corrected to gradually decrease (the direction in which the single battery voltage increases). This discharge limit ratio is determined by the position of the single battery voltage anywhere between the threshold voltage 1 and 2. The discharge limit ratio determined is the product of the battery pack temperature and the power limit value determined from the SOC and the rate of deterioration of a single battery.

Even in a normal state, it is possible to accurately detect an excess discharge state before encountering irreversible deterioration before reaching the discharge/charge prohibited voltage, and thus prevent damage to single batteries.

Figure 9:
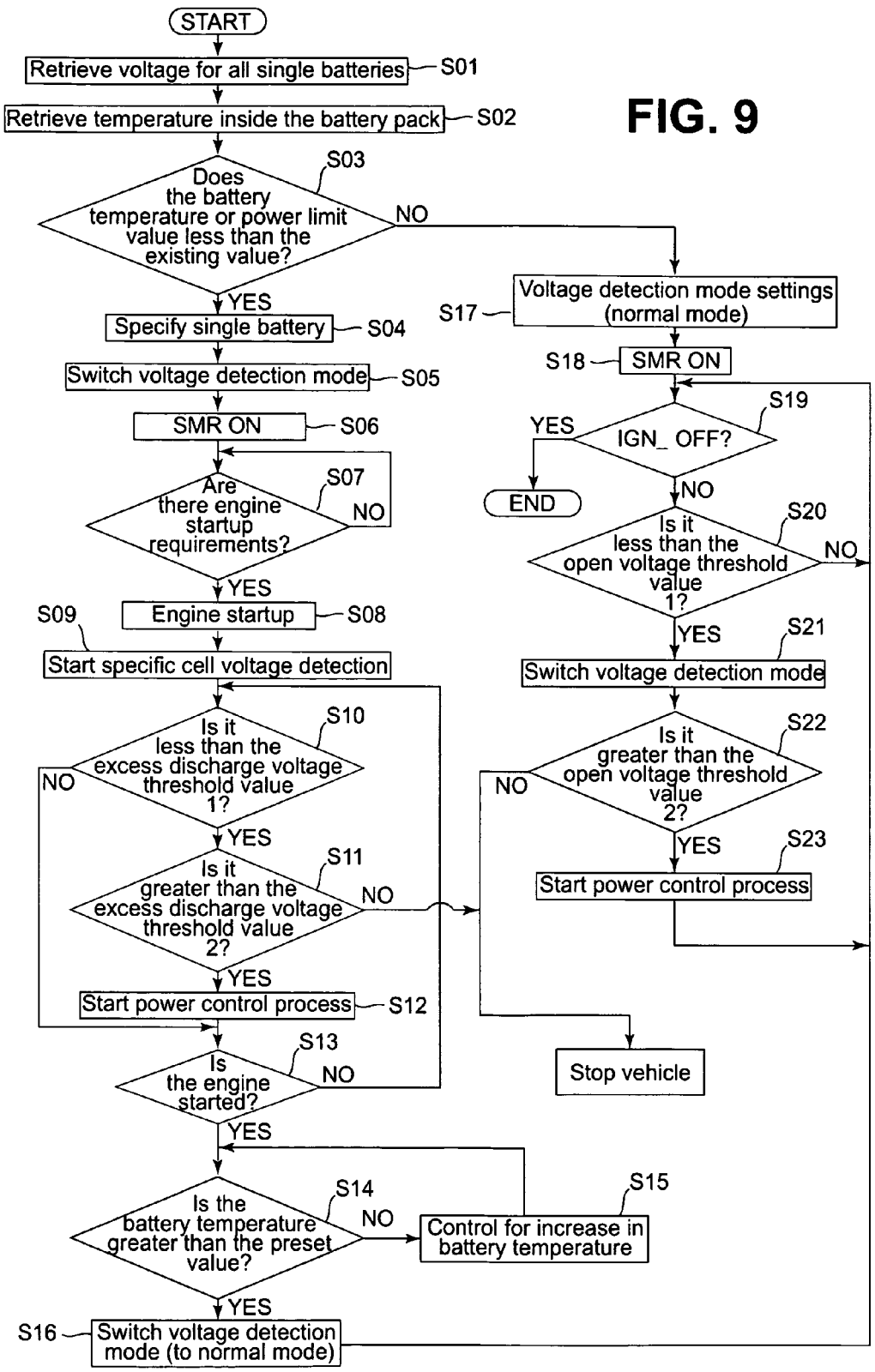
FIG. 9 is a flowchart illustrating an example method of battery pack control in accordance with the principles of the invention.

FIG. 9 is a flowchart illustrating an example method of battery pack control in accordance with the principles of the invention. First, the data for the open voltage value for all of the single batteries that make up the battery pack is measured in the state prior to engine startup (Step S01). Next, the temperature distribution data in the battery pack is obtained (Step S02). This data is retrieved to determine if there is a single battery where the battery output limit value that takes the internal resistance for all of the single batteries stored in the memory into consideration does not reach the estimated prescribed value relating to temperature and power (voltage) (Step S03). If the results show the existence of a single battery that does not reach the prescribed value (Step S03/YES), the single battery that does not reach the prescribed value is designated to possibly reach an excess discharge state during engine startup (Step S04).

After specifying a single battery by detecting the voltage during engine startup in this manner, the voltage detection interval or the threshold value for the excess discharge detection threshold value 1 or 2 is modified (Step S05). After conducting each of these processes, turn the SMR ON (Step S06) to access the state waiting for engine startup required (Step S07). In Step 07, the state of Step S07/NO will continue until the command for engine startup required arrives. Once the engine startup requirements are input, proceed to Step S07/YES and access the engine startup state (Step S08).

After designating a single battery as indicated above, detection of the voltage value for this designated battery is started (Step S09). With this voltage detection, first, determine whether or not this voltage value has dropped to less than the excess discharge voltage threshold value 1. If it is less than the excess discharge voltage threshold value 1 (Step S10/YES), determine whether or not the single battery for the excess discharge voltage threshold value 2 has reached the reversible deterioration voltage load. If the excess discharge voltage threshold value 2 has been reached (Step S11/NO), discharge is discontinued and the vehicle is stopped.

Processing is conducted to limit the discharge power from a single battery to prevent reaching the excess discharge voltage threshold value 2 (Step S12). If greater than the excess discharge voltage threshold value in step S10 (Step S10/NO), the single battery is normal so there is no need for discharge power limits and a determination can be made whether or not to start the engine. If the discharge power limit processing still has not been completed (Step S13/NO), the discharge processing continues until the SOC for the single battery recovers to a normal state by returning to step S10 to repeat this process loop. Once the Step S10/NO state has been achieved, Step S13 allows engine startup (Step S13/YES) and the engine is started.

After engine startup, temperature measurements on the battery pack are started. For proper operation, the battery must have a temperature greater than a preset value so temperature measurements are started on the battery. If the battery temperature does not reach the preset value (Step S14/NO), increased battery temperature controls (Step S15) are conducted until the temperature reaches the present value. Once the temperature reaches the preset value (Step S14/YES), engine startup is completed so the single battery voltage detection mode switches to the normal mode, and it switches to return the voltage measurement cycle and excess discharge voltage detection threshold value 1 and 2 modified in step S05 to the normal state (Step S15). This state continues until the ignition switch is OFF (IGN_OFF) and when the ignition switch is OFF, (Step S16/YES), all of the processing stops.

In step S03, if there are no problems with the battery temperature or discharge power value (Step S03/NO), specific processing on the single battery is not required so the voltage detection mode is accessed (Step S17) as the normal mode and the SMR accesses the ON state (Step S18). In this state, with the ignition switch OFF (step S19/YES), it is possible to complete all processing and while ON (Step S19/NO), a determination can be made whether or not the open voltage for a single battery has reached the voltage threshold value 1 shown in FIG. 3. If the open voltage is higher than the voltage threshold value 1 that is the discharge power limit open level (Step S20/NO), there are no problems with operation so this state is continued until the ignition switch is turned OFF (Step S19/YES). If the open voltage does not reach the voltage threshold value 1 (Step S20/YES), the voltage detection mode is switched and the settings for the voltage measurement cycle and excess discharge detection threshold value 1 and 2 are modified (Step S21). In this state, the open voltage measurements continue and if the open voltage drops to less than the voltage threshold value 2 that is the voltage where irreversible deterioration of the battery occurs (Step S22/NO), discharge is stopped and the vehicle is immediately stopped. If higher than the voltage threshold value 2 (Step S22/YES), power control processing is started (Step S23), and normal operation is continued while implementing the power controls until the ignition switch is turned OFF (Step S19/YES).

Various embodiments of the invention have been described. These and other embodiments are within the scope of the following claims.

The invention claimed is:

1. A battery pack controller connected with a battery pack coupled to a motor/generator, the battery pack including a plurality of single batteries to supply electric power to the motor/generator, the battery pack controller comprising:
   a voltage detector having a plurality of voltage detection circuits each in electrical communication with a single battery of the plurality of single batteries to detect a voltage of the single battery;
   a detected voltage transmitter in electrical communication with each voltage detection circuit of voltage detector to retrieve voltages detected by the plurality of voltage detection circuits and to transmit the detected voltages;
   a specific battery detector configured to classify each single battery of the plurality of single batteries as a normal battery if the voltage of the single battery is above a threshold value or as a target battery if the voltage of the single battery is below a threshold value based on the transmitted voltages; and
   a power supply controller configured to supply electric power from the battery pack to the motor/generator during internal combustion engine startup, wherein the power supply controller is configured to retrieve voltages from each single battery of the target batteries during internal combustion engine startup using the plurality of voltage detection circuits and limit the electric power supplied to the motor/generator by the battery pack during internal combustion engine startup if any of the target batteries have voltages that are below the threshold value.

2. A battery pack controller as claimed in claim 1, wherein the specific battery detector is configured to identify the single battery of the plurality of single batteries having the lowest power available for discharge, up to a threshold voltage value that acts as an excess discharge limit startup voltage that activates battery discharge limits.

3. A battery pack controller as claimed in claim 1, wherein the power supply controller is configured to calculate an amount of power available for discharge from an open voltage for the specified batteries, an internal resistance calculated from a load cuffent during operation prior the time of calculation, and the threshold voltage value.

4. A battery pack controller as claimed in claim 1, further comprising:
   a map of a relationship between a temperature previously measured and an internal resistance;
   a temperature detector configured to detect a temperature in the battery pack; and
   an internal resistance corrector configured to correct an internal resistance value of a battery in the battery pack based on the temperature detected by the temperature detector according to the map.

5. A battery pack controller as claimed in claim 1, wherein the power supply controller is configured to set a threshold voltage value to control a charge state of the target battery according to one of a vehicle state consisting of one of engine operation or startup, a temperature of the target battery, or combination of battery temperatures, such that
   when a battery temperature is lower than a prescribed temperature, an excess discharge is detected, and a voltage threshold value to control a power output and a voltage threshold value prohibiting output are set lower than during a normal state wherein the battery temperature is higher than the prescribed value, and
   when the battery temperature is higher that the prescribed temperature, a hypothetical internal resistance is calculated for the charge state for a lower control of the target battery from the calculated internal resistance and the temperature of the target battery, and a maximum battery output value is estimated using the hypothetical internal resistance to determine a control startup voltage threshold value.

6. A battery pack controller as claimed in claim 1, wherein the controller does not stop the internal combustion engine after an ignition switch is turned ON until a battery temperature exceeds a prescribed temperature, except when the ignition switch is turned OFF.

7. A battery pack controller as claimed in claim 1, further comprising:
   an output power controller configured to control the charge state of the target battery such that during one of an excess discharge state or an excess charge detection state for each single battery within the battery pack, when an excess discharge or excess charge state is entered due to detection of one of the single batteries being below a first threshold value that is a discharge power control startup voltage, voltage detection for each battery is conducted with a cell controller, and a battery exceeding the threshold value is specified,
   wherein voltage detection on the specified battery is conducted one of continuously or at a cycle shorter than the drop in the voltage of the target battery due to discharge, such that the target battery does not reach a second threshold value, wherein the second threshold value is an irreversible deterioration voltage for the target battery.

8. A vehicle equipped with an internal combustion engine, comprising:
   a motor/generator capable of starting the internal combustion engine;
   a battery pack including a plurality of single batteries that supply power to the motor/generator;
   a voltage detector having a plurality of voltage detection circuits each in electrical communication with a single battery of the plurality of single batteries to detect the voltage of each single battery;
   a detected voltage transmitter configured to retrieve voltages detected on each single battery of the plurality of single batteries from the plurality of voltage detection circuits and to continuously transmit each voltage detected;
   a specific battery detector configured to classify each single battery of the plurality of single batteries as a normal battery if the voltage of the single battery is above a threshold value or as a target battery if the voltage of the single battery is below a threshold value based on the transmitted voltages; and a power supply controller configured to supply electric power from the battery pack to the motor/generator during internal combustion engine startup, wherein the power supply is configured to retrieve voltages from each single battery of the target batteries during internal combustion engine startup using the plurality of voltage detection circuits and limit the electric power supplied to the motor/generator by the battery pack during internal combustion engine startup if any of the target batteries have voltages that are below the threshold value.

9. A vehicle as claimed in claim 8, wherein the specific battery detector is configured to detect the battery of the plurality of batteries having the lowest power available for discharge, up to a threshold voltage value that acts as an excess discharge limit startup voltage that activates battery discharge limits.

10. A vehicle as claimed in claim 9, wherein the power supply controller is configured to calculate an amount of power available for discharge from an open voltage for the target battery, an internal resistance calculated from a load current during operation prior the time of calculation, and the threshold voltage value.

11. A vehicle as claimed in claim 8, further comprising:
a map of a relationship between a temperature previously measured and an internal resistance;
a temperature detector configured to detect a temperature in the battery pack; and
an internal resistance corrector configured to correct an internal resistance value of the specific battery based on the temperature detected by the temperature detector according to the map.

12. A vehicle as claimed in claim 8, wherein the power supply controller is configured to set a threshold voltage value to control a charge state of the target battery according to one of a vehicle state consisting of one of engine operation or startup, a temperature of the target battery, or combination of battery temperatures, such that
when a battery temperature is lower than a prescribed temperature, an excess discharge is detected, and a voltage threshold value to control a power output and a voltage threshold value prohibiting output are set lower than during a normal state wherein the battery temperature is higher than the prescribed value, and
when the battery temperature is higher that the prescribed temperature, a hypothetical internal resistance is calculated for the charge state for a lower control of the target battery from the calculated internal resistance and the battery temperature, and a maximum battery output value is estimated using the hypothetical internal resistance to determine a control startup voltage threshold value.

13. A vehicle as claimed in claim 8, wherein stopping the internal combustion engine after an initial internal combustion engine startup after an ignition switch is turned ON is not allowed until a battery temperature exceeds a prescribed temperature, except when the ignition switch is turned OFF.

14. A vehicle as claimed in claim 8, further comprising:
an output power controller configured to control the charge state of the target battery such that during one of an excess discharge state or an excess charge detection state for all of the plurality of batteries within the battery pack, when an excess discharge or excess charge state is entered due to detection of a battery of the plurality of batteries outside a first threshold value that is a discharge power control startup voltage, voltage detection for the batteries is conducted with a cell controller, and a battery of the plurality of batteries exceeding the threshold value is specified as the target battery,
wherein voltage detection on the target battery is conducted one of continuously or at a cycle shorter than the drop in the target battery voltage due to discharge, such that the target battery does not reach a second threshold value,
wherein the second threshold value is an irreversible deterioration voltage for the target battery.

15. A battery pack controller connected with a plurality of single batteries that comprise a battery pack and that supply power to a motor/generator for starting an internal combustion engine, comprising:
means for detecting a voltage of each single battery of the plurality of single batteries and supplying power to the motor/generator;
means for retrieving the voltage detected of each single battery of the plurality of single batteries and to transmit the detected voltages;
means for classifying each single battery of the plurality of single batteries as a normal battery if the voltage of the single battery is above a threshold value or as a target battery if the voltage of the single battery is below a threshold value based on the transmitted voltages;
means for retrieving voltages from each single battery of the target batteries using the plurality of voltage detection circuits during internal combustion engine startup; and
means for supplying electric power from the battery pack to the motor/generator during internal combustion engine startup, wherein the power supplied to the motor/generator by the battery pack during internal combustion engine startup is limited if any of the target batteries have voltages that are below the threshold value.

16. A method comprising:
detecting a voltage of each single battery of a plurality of single batteries that comprise a battery pack and that supply power to a motor/generator for starting an internal combustion engine;
retrieving the voltage detected for each single battery of the plurality of batteries;
transmitting each voltage detected;
classifying each single battery of the plurality of single batteries as a normal battery if the voltage of the single battery is above a threshold value or as a target battery if the voltage of the single battery is below a threshold value based on the transmitted voltages;
detecting a voltage for each target battery during internal combustion engine startup; and
supplying electric power from the battery pack to the motor/generator during internal combustion engine startup, wherein the power supplied to the motor/generator by the battery pack during internal combustion engine startup is limited if any of the target batteries have voltages that are below the threshold value.

17. The method of claim 16, further comprising:
calculating an amount of power available for discharge from an open voltage for the specified single batteries, an internal resistance calculated from a load current during operation prior the time of calculation, and the threshold voltage value; and
detecting single batteries of the plurality of single batteries having the lowest power available for discharge, up to a threshold voltage value that acts as an excess discharge limit startup voltage that activates battery discharge limits.

18. The method of claim 16, further comprising:

storing a map of a relationship between a temperature previously measured and an internal resistance;

detecting a temperature in the battery pack; and correcting an internal resistance value of the specific battery based on the temperature detected by the temperature detector according to the map.

19. The method of claim 16, further comprising:

setting a threshold voltage value to control a charge state of the specific single battery according to one of a vehicle state consisting of one of engine operation or startup, a single battery temperature, or combination of battery temperatures, such that when a battery temperature is lower than a prescribed temperature, an excess discharge is detected, and a voltage threshold value to control a power output and a voltage threshold value prohibiting output are set lower than during a normal state wherein the battery temperature is higher than the prescribed value, and when the battery temperature is higher that the prescribed temperature, a hypothetical internal resistance is calculated for the charge state for a lower control of the specified single battery from the calculated internal resistance and the battery temperature, and a maximum battery output value is estimated using the hypothetical internal resistance to determine a control startup voltage threshold value.

20. The method of claim 16, further comprising:

controlling the charge state of the single battery such that during one of an excess discharge state or an excess charge detection state for all of the single batteries within the battery pack, when an excess discharge or excess charge state is entered due to detection of a single battery outside a first threshold value that is a discharge power control startup voltage, voltage detection for the single batteries is conducted with a cell controller, and a single battery exceeding the threshold value is specified; and conducting voltage detection on the specified single battery one of continuously or at a cycle shorter than the drop in single battery voltage due to discharge, such that the specified single battery does not reach a second threshold value, wherein the second threshold value is an irreversible deterioration voltage for the single battery designated by battery controller software.

21. The battery pack controller as claimed in claim 1, wherein the voltages of the normal batteries are not retrieved during internal combustion engine startup.

* * * * *